(No Model.)

L. SURPRENANT.
NUT LOCK.

No. 371,526. Patented Oct. 11, 1887.

WITNESSES:
Chas. H. Luther Jr.
Willis Fowler,

INVENTOR:
Lucien Surprenant
by Joseph A. Miller & Co.
Attys

UNITED STATES PATENT OFFICE.

LUCIEN SURPRENANT, OF PUTNAM, CONNECTICUT.

NUT-LOCK.

SPECIFICATION forming part of Letters Patent No. 371,526, dated October 11, 1887.

Application filed June 8, 1887. Serial No. 240,591. (No model.)

*To all whom it may concern:*

Be it known that I, LUCIEN SURPRENANT, of Putnam, in the county of Windham and State of Connecticut, have invented certain new and useful Improvements in Nut-Locks, of which the following is a full, clear, and exact description, reference being had to the accompanying drawings, forming part of this specification.

This invention relates to a device for locking and retaining bolt-nuts in position upon their bolts, so as to prevent the nuts from being worked loose by the constant jarring and shaking which they may be subjected to when used, for example, upon machinery or railway-rails.

The objects of my invention are to provide an efficient and durable nut-lock which is adapted to lock a set of nuts and which may be placed under control of an ordinary lock and key.

To the aforesaid purposes my invention consists, essentially, in the certain combinations set forth in the claim at the close of this specification and comprising the following mechanical features—namely, a pair of hinged frames or members cut away to receive the bolts, and provided upon their meeting faces with seats appropriate to receive the respective transverse halves of the bolt-nuts, means for locking the said members together, the bolts, and the bolt-nuts.

In order that my invention may be fully understood, I have illustrated in the accompanying drawings, and will proceed to describe, the best form thereof so far devised by me with the knowledge that the same may be somewhat modified, without, however, making a substantial departure from the spirit of the invention.

Figure 1:
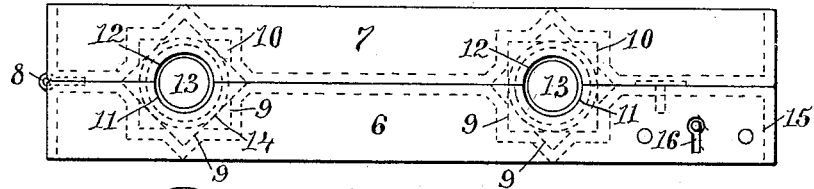
Figure 2:
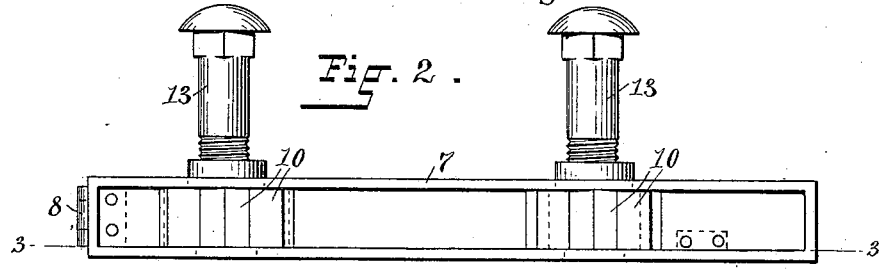
Figure 3:
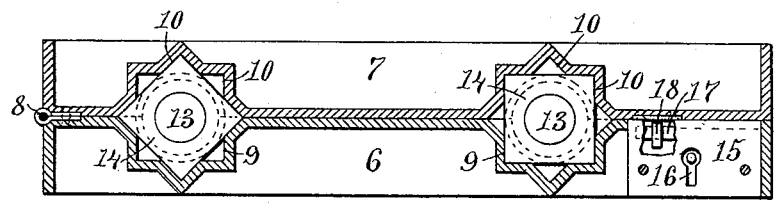
Figure 4:
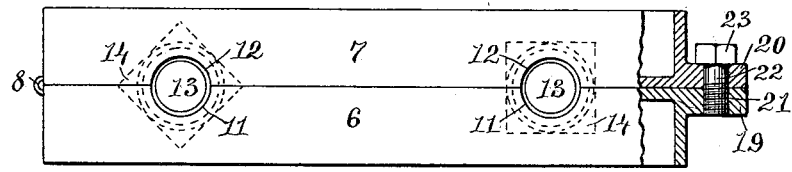

In the accompanying drawings, Figure 1 is a side view of my improved nut-lock and shows the side opposite where the bolts enter the nut-lock, the bolt-heads, nuts, and the seats for the nuts being shown in broken lines. Fig. 2 is a top plan view of Fig. 1. Fig. 3 is a sectional view taken on line 3.3 in Fig. 2. Fig. 4 is a side view of my improved nut-lock having different locking means for the two members than the means shown in the other views.

In the said drawings like numbers of reference designate corresponding parts throughout.

Referring to the drawings, the numbers 6 and 7 designate, respectively, the lower and the upper members or frames, which are hinged together at one end by means of the hinge 8, and are adapted to open and close on each other in an obvious manner. The meeting faces of the members 6 and 7 are provided, respectively, with the seats 9 and 10, which are formed in a series for each bolt-nut in such manner that when the two members are closed on each other the two opposite sets of seats 9 and 10 of the respective members will together form something of a star shape, as shown in the sections in Fig. 3.

The respective members 6 and 7 are cut away at 11 and 12, in order to receive the bolts 13, upon which the bolt-nuts 14 work. The object in having the series of seats 9 and 10 for the bolt-nuts is to avoid an extended adjustment of the nuts in order to get them in position to receive the locking members.

Each member 6 and 7 receives one of the respective transverse halves, or the upper and lower halves, respectively, as shown in Figs. 1, 3, and 4, of the bolt-nuts 14, which are entirely concealed and locked when the members are closed.

The members or frames 6 and 7 may be made out of cast-iron or any suitable well-known material.

In order to maintain the members securely in locked position, I have provided the lower member, 6, with a spring-lock, 15, having a key-hole, 16, to receive a key which is not shown. The bolt 17 of the spring-lock is adapted to lock with the staple 18, which is secured to the upper member, 7. In this manner the members may be placed under control of an ordinary lock and key.

In Fig. 4 I have shown a modified form of the locking means for the members 6 and 7, and the same consists in the ears 19 and 20, formed upon the respective members and provided with the screw-threaded perforations 21 and 22, respectively. These perforations 21 and 22 are arranged to register with each other when the members are closed, so that the ears 19 and 20 may be secured together by means of the screw-stem 23, which may be passed through the perforations 21 and 22, as shown.

The members or frames 6 and 7 may be formed with several seats, as 9 and 10, in order to include and to lock more than the two nuts shown.

The operation of the device will be readily understood. When the nuts are screwed down into position, the members 6 and 7 are opened and are placed over the nuts 14, so as to receive the same in the respective seats 9 and 10. Then the members are brought together and locked.

Having thus described my invention, I claim as new and desire to secure by Letters Patent—

The combination, as hereinbefore set forth, with the bolts and bolt-nuts, of two members hinged together and cut away to receive the bolts, and provided upon their meeting faces with seats appropriate to receive and seat the respective transverse halves of the nuts, and means for locking the said members together, substantially as and for the purpose herein described.

LUCIEN SURPRENANT.

Witnesses:
 NAPOLEON N. CHASSEY,
 SAMUEL H. SEWARD.